United States Patent [19]

Ogihara et al.

[11] Patent Number: 5,359,376
[45] Date of Patent: Oct. 25, 1994

[54] CAMERA AND FILM WINDING-UP APPARATUS FOR CAMERA

[75] Inventors: Masuo Ogihara; Yoichi Seki; Hiroyuki Saito, all of Chiba, Japan

[73] Assignee: Seikosha Co., Ltd., Tokyo, Japan

[21] Appl. No.: 992,861

[22] Filed: Dec. 16, 1992

[30] Foreign Application Priority Data

| Dec. 24, 1991 | [JP] | Japan | 3-341088 |
| Dec. 26, 1991 | [JP] | Japan | 3-344960 |
| Dec. 26, 1991 | [JP] | Japan | 3-344962 |
| Jan. 17, 1992 | [JP] | Japan | 4-006430 |
| Jan. 17, 1992 | [JP] | Japan | 4-006431 |
| Jan. 21, 1992 | [JP] | Japan | 4-008264 |
| Jan. 22, 1992 | [JP] | Japan | 4-009315 |

[51] Int. Cl.$^5$ ............................................. G03B 1/18
[52] U.S. Cl. .................................................. 354/173.1
[58] Field of Search ........................... 354/173.1, 173.11

[56] References Cited

U.S. PATENT DOCUMENTS 4,758,851 7/1988 Zeth ..................................... 354/72
5,124,735 6/1992 Tsukahara et al. ................. 354/106

FOREIGN PATENT DOCUMENTS 0293510 4/1990 Japan .
2073424 10/1981 United Kingdom .

Primary Examiner—Howard B. Blankenship
Attorney, Agent, or Firm—Jordan and Hamburg

[57] ABSTRACT

An apparatus for winding up film in a camera has a direct current brush motor and an arrangement for producing a pulse train of pulses in response to the production of brush noise by said motor as it rotates. A control circuit is responsive to the pulse train of pulses to control the advancing and rewinding of the film as well as to detect the winding ends and to detect the occurrence of film loading errors.

25 Claims, 13 Drawing Sheets time

FIG. 13
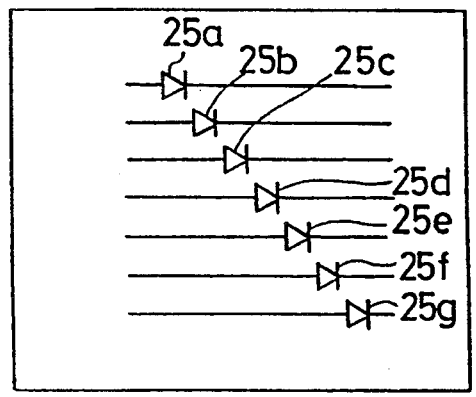
26 film
A 5,359,376

CAMERA AND FILM WINDING-UP APPARATUS FOR CAMERA

FIELD OF THE INVENTION

The present invention relates to a camera and a film winding-up apparatus for a camera.

BACKGROUND OF THE INVENTION

In a conventional film winding device for a camera, the amount of film wound up has been controlled by counting the number of perforations formed in a film.

A practical prior art method for detecting the perforations is as follows:

A reflective photointerrupter is disposed on one side, and a black member for absorbing the light emitted by the photointerrupter is disposed on the other side of the film in such a way that the reflective photointerrupter and the black member sandwiches the perforations formed in a film.

Further, the light emitted from a light emitting diode is reflected by or transmitted through a series of film perforations, and received by a light receiving element to detect the film perforations, whenever the film perforations are passed between the reflective photointerrupter and the black member.

The film loading error and the ends of film winding-up operation and film rewinding operation have been detected so far by counting the number of perforations formed in the film.

A prior art method of detecting a film loading error is as follows:

When a film is loaded in a camera and then a rear lid is closed, the film is wound up by three frames. In this film winding-up operation by three frames, when the detection signals of the photointerrupter for detecting the film perforations are not generated continuously for a predetermined time, a film loading error is detected by determining that the film is not wound up correctly.

The prior art method for detecting the ends of the film winding-up and film rewinding operation is as follows:

When the film is being wound up or rewound, the detection signals of the photointerrupter for detecting the film perforations are to be generated in unison with the film feeding operation. However, when the film winding-up operation ends, the detection signals are not generated from the photointerrupter. Therefore, when the detection signals are not generated continuously beyond a predetermined time, the end of the film winding-up or rewinding operation is determined.

In the prior art method for detecting a film loading error and the end of film winding-up or rewinding operation, as described above, since a photointerrupter and other elements are used, there exist various problems in that the number of parts is large; the cost thereof is high; and the size thereof is large because the photointerrupter is large in size and therefore it is difficult to house these elements in a subminiature camera.

In addition, since the amount of film winding-up is not directly detected as described above, when the amount of film winding is controlled by the amount of rotation of the motor, there exists a problem in that it is not impossible to simply control the amount of film winding on the basis of the rotation of the motor, because the amount of film winding for each separate motor rotation is different, depending upon the amount of film already wound up.

SUMMARY OF THE INVENTION

Accordingly, the first object of the present invention is to provide a film winding apparatus for a camera, which is simple in construction and accurate in its film winding operation.

In particular, the first object is to improve the film winding precision by making adjustments that take into consideration the dispersion in characteristics of direct current brush motors used for winding up the film as well as fluctuations in temperature and battery voltage.

The second object of the present invention is to provide a film winding apparatus for a camera, which can detect a film loading error in spite of a relatively simple construction.

The third object of the present invention is to provide a film winding apparatus for a camera, which can detect the ends of film winding and rewinding operations in spite of the use of a relatively simple construction.

The fourth object of the present invention is to provide a camera which can photograph data onto a film accurately in spite of a relatively simple construction.

BRIEF DESCRIPTION OF THE DRAWINGS

In order that the invention may be more clearly understood, it will now be disclosed in greater detail with reference to the accompanying drawings, wherein:

FIG. 13 is an illustration showing an essential portion of the embodiment shown in FIG. 9.

DESCRIPTION OF THE PREFERRED EMBODIMENTS

A first embodiment of the present invention applied to the film winding and rewinding operations of a camera will now be described hereinbelow with reference to the attached drawings.

Figure 1:
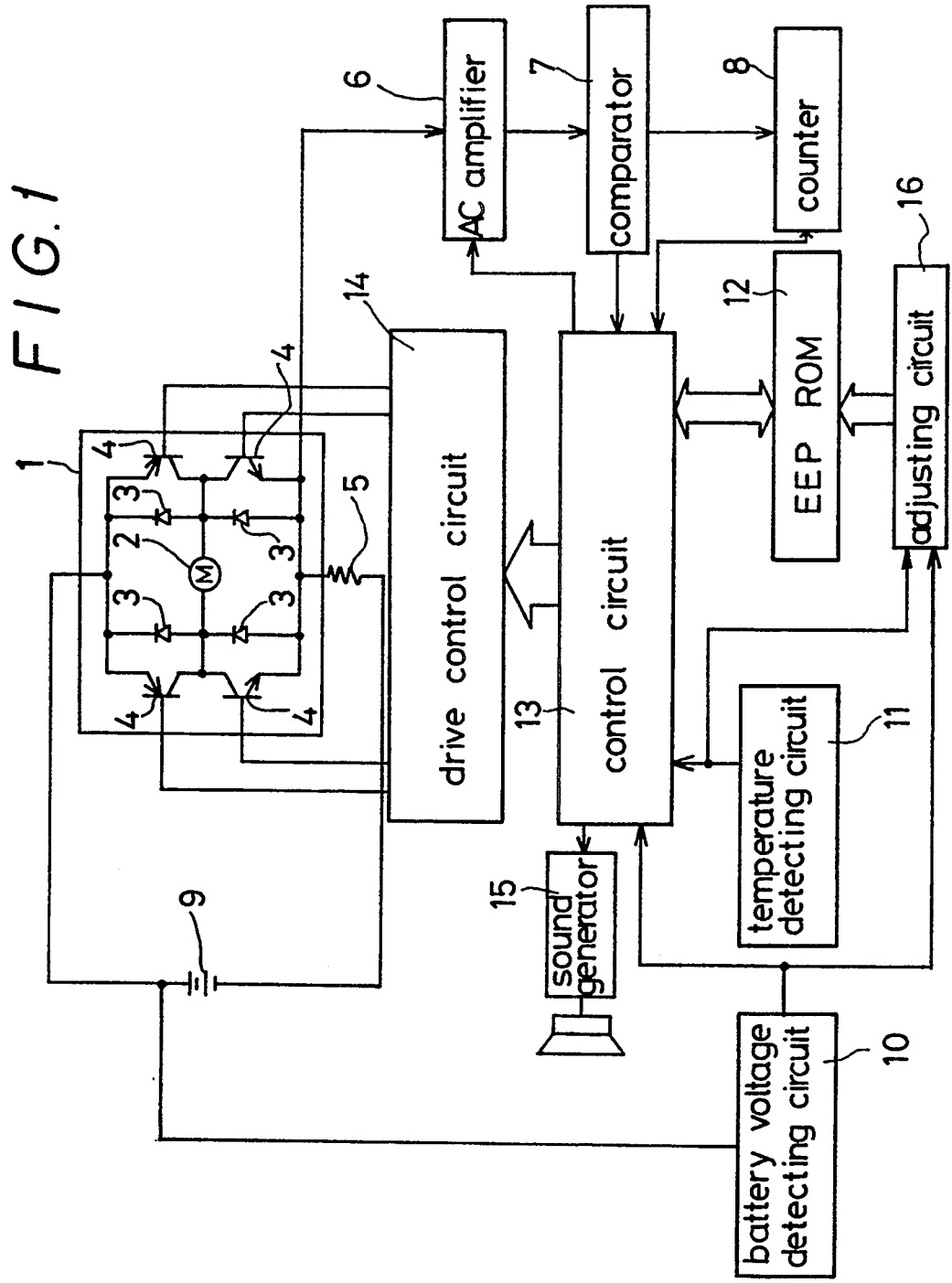
FIG. 1 is a circuit block diagram showing one embodiment of the present invention.

In FIG. 1, the apparatus comprises a motor bridge circuit 1 comprised of a direct current brush motor 2, diodes 3, transistors 4, and a resistor 5, so as to control bi-directional rotation of the direct current brush motor 2. A film (not shown) is wound up or rewound by driving the direct current brush motor 2. The resistor 5 connected between the battery 9 and one diagonal of the bridge is used to detect brush noise generated when the direct current brush motor 2 is rotating. The apparatus further comprises an AC amplifier 6, a comparator 7, a counter 8, a battery 9 used as a power supply, a battery voltage detecting circuit 10 for detecting the voltage of the battery power supply 9, a temperature detecting circuit 11 for detecting ambient temperature, and a memory circuit 12 of EEPROM (in this embodiment) for storing the following various data: data indicative of the amount of rotation of the direct current brush motor 2 for a predetermined amount of film feed (one or three frames) which changes whenever the film is wound up, that is, as a function of the amount of film already wound up; data indicative of amplification factor of the AC amplifier 6 determined as a function of the direct current brush motor 2 used in this embodiment (this is necessary since there is a difference in brush noise generated by different motors 2); data indicative of a threshold voltage level (threshold value) for the comparator 7; data for adjusting the amplification factor of the AC amplifier 6 and the threshold value of the comparator 7 as a function of the battery voltage and the ambient temperature; data indicative of timing at which the direct current brush motor 2 is braked as a function of the amount of film to be wound up, that is, the amount of rotation of the direct current brush motor 2; and data indicative of an allowable range of pulse intervals of the brush noise generated when the brush motor 2 is rotating normally, etc.

The apparatus further comprises a control circuit 13 composed of CPU, ROM and RAM, etc. to control various operations, a drive control circuit 14 for controllably turning on or off the transistors 4 in response to signals from the control circuit 13, a sound generator 15 provided with a speaker to generate an alarm sound when the control circuit 13 determines the presence of a film loading error, and an adjusting circuit 16 for adjusting the criterion used by the control circuit when a film loading error is determined to exist by the control circuit 13, on the basis of the respective outputs detected by the battery voltage detecting circuit 10 and the temperature detecting circuit 11.

Figure 2:
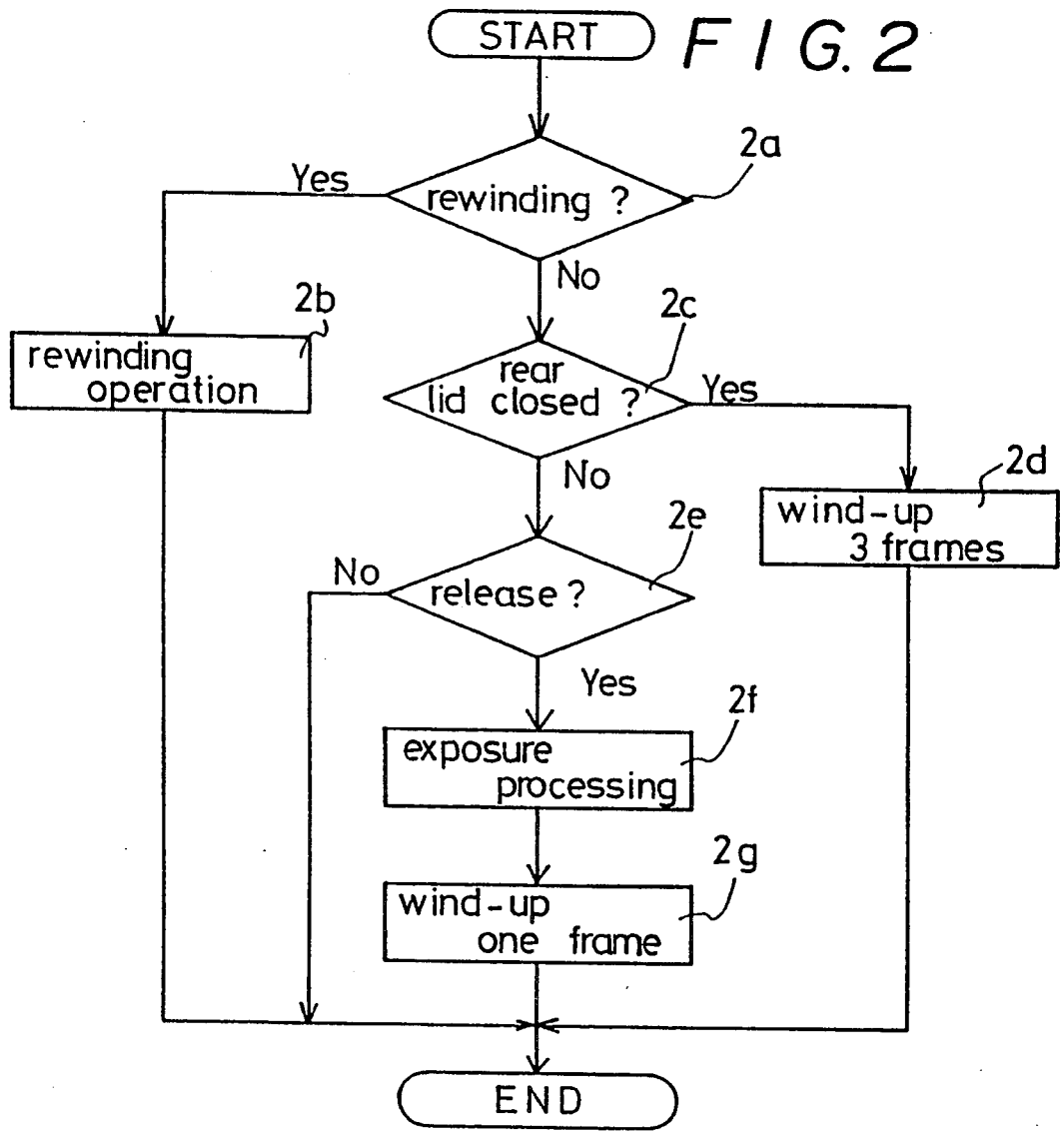
FIG. 2 is a flowchart for assistance in explaining the operation of the embodiment shown in FIG. 1.
Figure 3:
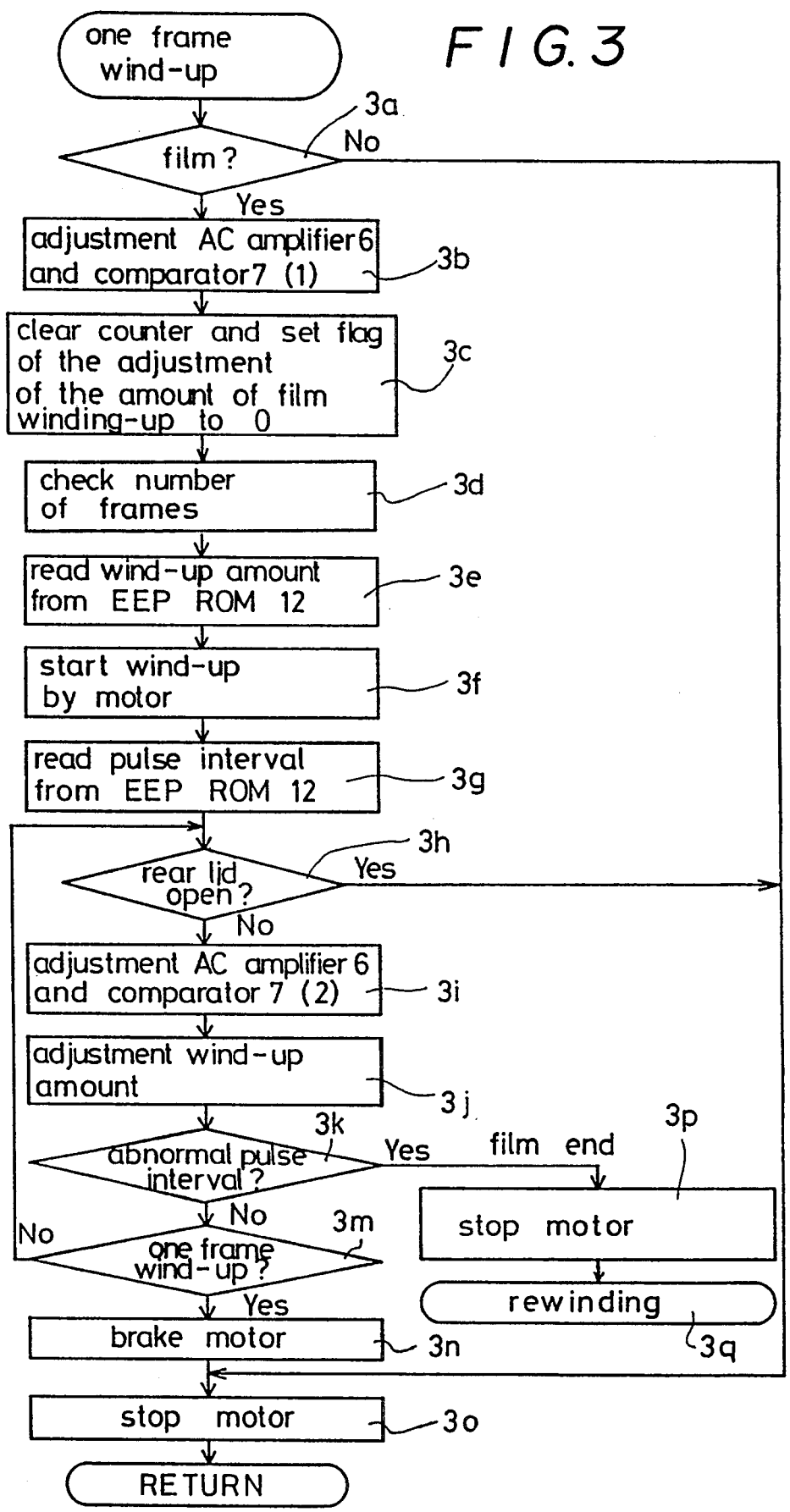
FIG. 3 is a flowchart for assistance in explaining the operation of the embodiment shown in FIG. 1.

The operation of the embodiment will be described with reference to FIG. 2.

When an external switch is operated and thereby the control circuit 13 detects a start signal input thereto, the following operation starts:

When a film rewinding switch is operated or when all the film is completely wound up by the film winding operation (in step 2a), the film rewinding operation is executed (in step 2b). When the rewinding operation is not executed (in step 2a) and further when the rear lid of the camera is closed (in step 2c), it is determined that a film is loaded into a camera and therefore the film is wound up by three frames (in step 2d). Under these conditions, when a shutter release button is depressed (in step 2e), an exposure process is executed (in step 2f) and thereafter the film is wound up by one frame (in step 2g).

The above-mentioned single frame winding operation will be described hereinbelow in further details with reference to FIGS. 3, 4, 5 and 6.

Here, the assumption is made that the number of film frames already wound up is stored in the RAM of the control circuit 13.

After the exposure process initiated by the depression of the shutter button has been completed, the presence or absence of the film is detected by a film detecting device (not shown) (in step 3a), and the adjustment process 1 for the AC amplifier 6 and the comparator 7 is executed in order to detect brush noise generated by the direct current brush motor 2 more accurately (in step 3b).

Figure 4:
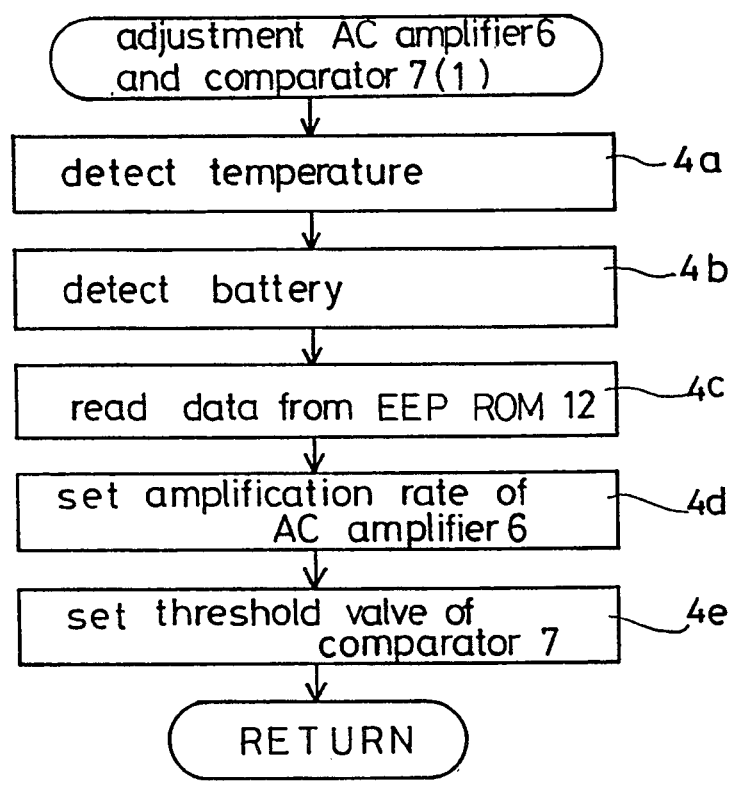
FIG. 4 is a flowchart for assistance in explaining the operation of the embodiment shown in FIG. 1.

The practical process of step 3b will be described in more detail with reference to FIG. 4.

The temperature detecting circuit 11 detects an ambient temperature (in step 4a), and the battery voltage detecting circuit 10 detects the battery voltage (in step 4b).

Successively, on the basis of the above-mentioned respective detection outputs, the control circuit 13 reads the set data indicative of AC amplification factor of the AC amplifier 6 and the threshold value of the comparator 7 previously stored as a function of the direct current used by the brush motor 2, from the EEPROM 12 (in step 4c), and on the basis of the read set data, the amplification factor of the AC amplifier 6 and the threshold value of the comparator 7 are adjusted and newly set (in steps 4d and 4e).

The above-mentioned adjustment is such that when the ambient temperature deviates from the normal temperature (about 25° C.), the amplification factor of the AC amplifier and the threshold value of the comparator 7 are both increased, for instance. Further, when the battery voltage is low, the amplification factor of the AC amplifier 6 and the threshold value of the comparator 7 are both increased.

After the end of the process in step 3b, the control circuit 13 clears the counter 8 and also a flag indicative of the adjustment of the amount of film winding (in step 3c).

Successively, the control circuit 13 reads the number of film frames already wound up, which is already stored in the RAM included in the control circuit 13 (in step 3d).

On the basis of the number of film frames read from the RAM, data indicative of the amount of rotation of the direct current brush motor 2 required to wind up one frame is read from the EEPROM 12 (in step 3e).

In response to an output of the control circuit 13, the drive control circuit 14 generates drive signals for driving the direct current brush motor 2, so that the required transistors 4 are turned on to rotate the direct current brush motor 2 and thereby the film winding operation starts (in step 3f).

Brush noise generated when the direct current brush motor 2 is being rotated is amplified by the amplifier 6 and then input to the comparator 7.

The comparator 7 generates a single pulse output, whenever brush noise beyond the threshold value is detected in voltage level, and this output is input to the counter 8 and the control circuit 13.

Further, in order to determine whether the brush noise pulses generated by the direct current brush motor 2 are generated normally, data indicative of the allowable range of the brush noise pulse intervals generated when the film is being wound up is read from the EEPROM 12 (in step 3g).

When the rear lid of the camera is open during the film winding operation (in step 3h) (the rear lid state is monitored by executing a process that is described later), the control circuit 13 stops the film winding process, so that the direct current brush motor 2 stops rotating (in step 3o).

Successively, the adjustment process 2 for the AC amplifier 6 and the comparator 7 is executed in order to detect brush noise from the direct current brush motor 2 accurately; that is, the AC amplifier 6 and the comparator 7 are both adjusted ( in step 3i).

Figure 5:
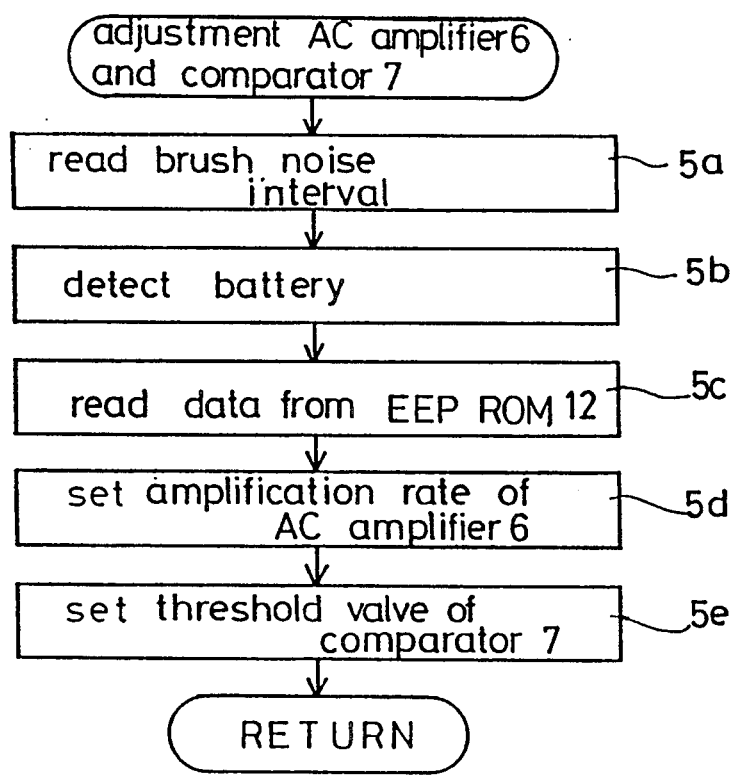
FIG. 5 is a flowchart for assistance in explaining the operation of the embodiment shown in FIG. 1.

Here, the practical operation of the adjusting process 2 in step 3i above will be described in more detail with reference to FIG. 5.

The control circuit 13 reads data indicative of the amount of adjustment as to the amplification factor of the AC amplifier 6 and the threshold value of the comparator 7 on the basis of the pulse intervals input from the comparator 7 thereto (in step 5a) and the battery voltage data detected by the battery voltage detecting circuit 10 (in step 5b) (in step 5c), and adjusts the amplification factor of the AC amplifier 6 and the threshold value of the comparator 7 under feedback control (in steps 5d and 5e).

In other words, since the intensity of the brush noise changes according to the rotational speed (pulse intervals) of the direct current brush motor 2, the adjustment is necessary to accurately detect the brush noise. In more detail, the adjustment is so executed that the amplification factor of the AC amplifier 6 and the threshold value of the comparator 7 are decreased with increasing rotational speed of the direct current brush motor 2.

Thereafter, the film winding amount adjustment processing is executed ( in step 3j).

Figure 6:
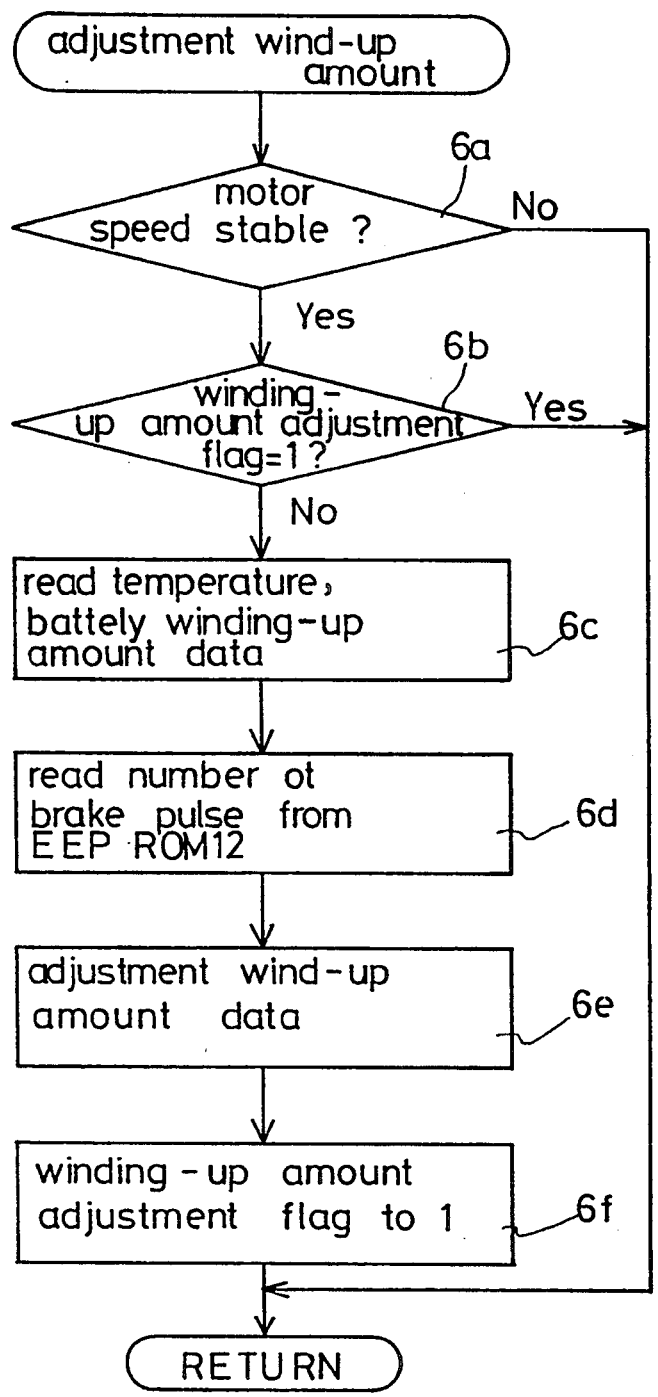
FIG. 6 is a flowchart for assistance in explaining the operation of the embodiment shown in FIG. 1.

Step 3j is described in more detail with reference to the practical operation as shown in FIG. 6.

The control circuit 13 determines whether the intervals of pulses input from the comparator 7, that is, the rotational speed of the direct current brush motor 2 is stable or not (in step 6a).

If the pulse intervals are stable, the control circuit 13 determines whether the film winding amount adjustment flag is at "1" (in step 6b).

If the film winding amount adjustment flag is not at "1", the control circuit 13 reads the timing (the number of pulses) at which the direct current brush motor 2 is braked, by having access to the EEPROM 12 on the basis of data indicative of the amount of film winding read in the above-mentioned step 3e. Further, the control circuit 13 reads the battery voltage detected by the operation in the step 3i, and the ambient temperature detected by the operation in step 3b (in steps 6c and 6d) and further adjusts the data indicative of the amount of film wound up or of the amount of rotation of the direct current brush motor 2 (in step 6e).

In other words, even after having been braked, since the direct current brush motor 2 rotates to some extent by the inertia thereof and further since this rotation due to the inertia changes or fluctuates according to the amount of the film already wound up and the temperature and battery voltage, it is necessary to adjust the data indicative of the amount of motor rotation so that the film stops accurately at a position where one frame is fed.

In practice, the brake application timing is delayed when the amount of film wound up increases, advanced when the battery voltage is high, and delayed when the ambient temperature deviates from the normal temperature (about 25° C.) because the mechanical load increases.

Successively, the film winding amount adjustment flag is set to "1" (in step 6f).

The film winding amount adjustment flag is provided in order to execute the film winding amount adjustment processing only once for each film winding processing.

Referring back to FIG. 3, the pulse intervals of the brush noise generated by the direct current brush motor 2 are compared with the allowable pulse interval range previously read (in step 3k). When there are no abnormal pulse widths, and further the counter 8 counts the number of pulses corresponding to the data indicative of the amount of rotation adjusted in step 3j (in step 3m), the control circuit 13 generates a braking output to turn on the transistors 4, so that the direct current brush motor 2 is braked and thereby stopped (in steps 3n and 3o).

In this step 3n, the control circuit 13 increments the number of stored film frames and stores the incremented valve in the RAM included in the control circuit 13 as the updated number of wound film frames.

When the counter 8 does not count the number of pulses corresponding to the data indicative of the amount of rotation adjusted in step 3j (in step 3m), the control circuit 13 returns to the step 3h again to execute the same operation as described above.

Further, in step 3k, if the intervals of noise pulses generated by the direct current brush motor 2 is out of the allowable range of the pulse interval read from the EEPROM 12, the control circuit 13 determines that the film has been wound up completely to its end, stops the direct current brush motor 2 (in step 3p), and executes the film rewinding process (in step 3q).

In other words, when the film is wound up to its end, since an excessive load is applied to the direct current motor 2 and therefore the motor stops, the pulse intervals of the brush noise increase beyond the allowable range, so that the film rewinding operation is executed.

Figure 7:
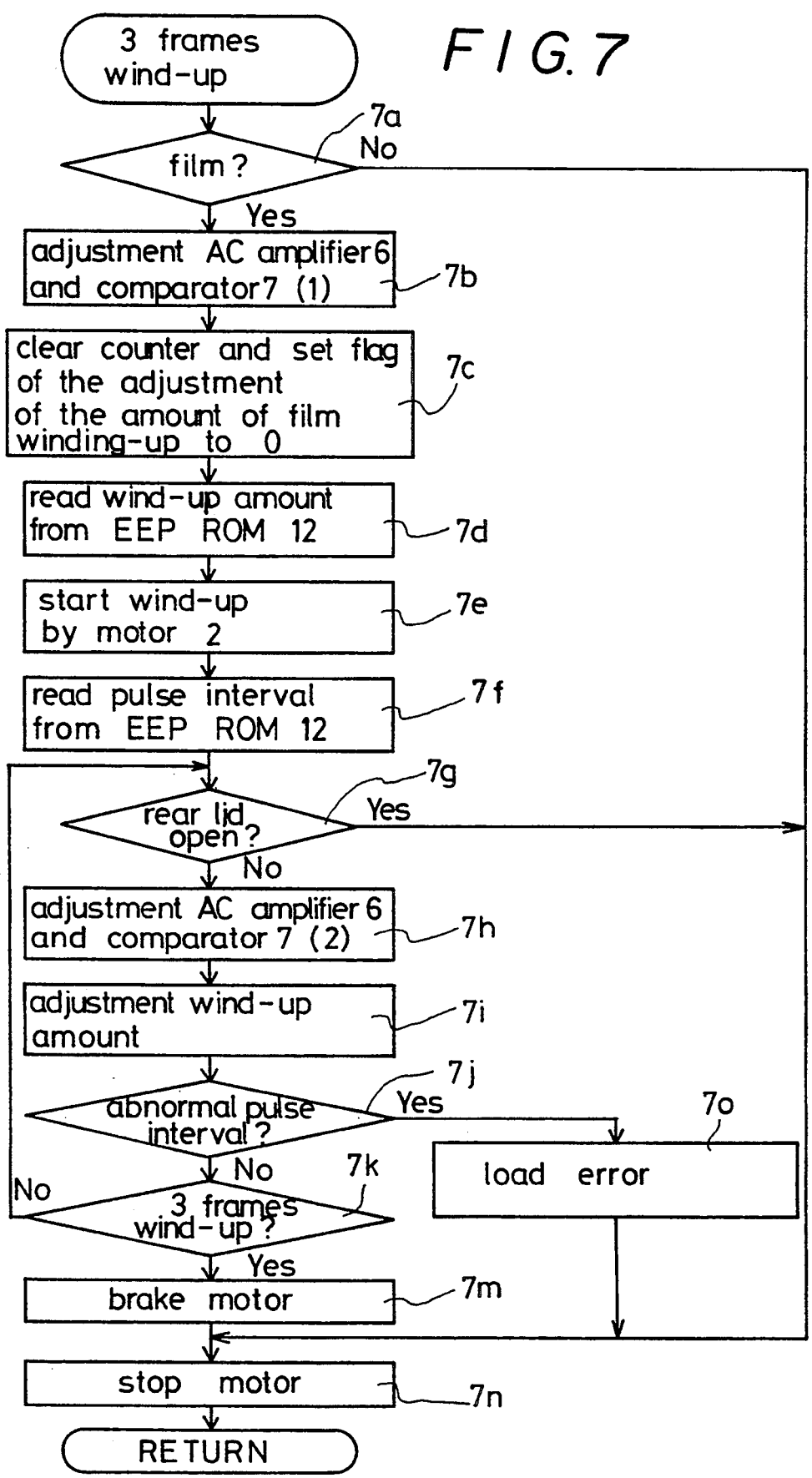
FIG. 7 is a flowchart for assistance in explaining the operation of the embodiment shown in FIG. 1.

The practical process of winding up the film by three frames in step 2d in FIG. 2 will be described mainly with reference to FIG. 7.

If the control circuit 13 detects a start signal generated when the rear lid is closed after a film has been loaded into a camera, the presence or absence of the film is detected by the film detecting device (not shown) (in step 7a). Thereafter, in order to detect the brush noise of the direct current brush motor 2, the adjustment process 1 of the AC amplifier 6 and the comparator 7 is executed (in step 7b).

The adjustment process 1 of the AC amplifier 6 and the comparator 7 of step 7b is the same as that described above with reference to FIG. 5.

After the process of step 7b, the control circuit 13 clears the counter 8, together with the film winding amount adjustment flag (in step 7c).

Further, the control circuit 13 reads the data indicative of the amount of rotation of the direct current brush motor 2 required to wind the film by three frames from the EEPROM 12 ( in step 7d).

In response to an output of the control circuit 13, the drive control circuit 14 generates a drive output to rotate the direct current brush motor 2 and thereby to start a film winding operation ( in step 7e).

The brush noise is generated and amplified by the AC amplifier 6. The amplified brush noise is input to the comparator 7, so that the comparator 7 generates one pulse signal whenever the brush noise exceeds the threshold value, and this pulse signal is input to the counter 8 and the control circuit 13.

To determine whether the brush noise generated by the direct current motor 2 is normal or not, the control circuit 13 reads the allowable data indicative of the pulse interval range of the brush noise pulse generated when the film is being wound up, from the EEPROM 12 (in step 7f).

The rear lid status is monitored by executing the process described later. If the lid is open during the film winding-up operation (in step 7g), the control circuit 13 interrupts the film winding-up operation and stops the direct current brush motor 2 from being further rotated (in step 7n).

When the rear lid is closed, the control circuit 13 executes the adjustment process 2 of the AC amplifier 6 and the comparator 7 in order to detect the brush noise of the direct current brush motor 2 accurately (in step 7h).

The adjustment process 2 of the AC amplifier 6 and the comparator 7 is the same as that described above with reference to FIG. 5.

Successively, the film winding amount adjustment process is executed (in step 7i).

This film winding amount adjustment process is also the same as that described above with reference to FIG. 6.

Thereafter, the adjustment circuit 16 adjusts the read allowable range data of the pulse intervals on the basis of the respective outputs of the battery voltage detecting circuit 10 and the temperature detecting circuit 11. The adjusted allowable range data of the pulse intervals is compared with the actual pulse widths of the brush noise pulses generated by the direct current brush motor 2. If the compared pulse widths are normal (in step 7j), and further when the counter 8 counts up the number of pulses corresponding to data indicative of the amount of rotation adjusted in step 7i (in step 7k), the control circuit 13 generates an output, and therefore the drive control circuit 14 generates a brake output to activate the transistors 4, so that the direct current brush motor 2 is braked and then stopped (in steps 7m and 7n).

On the other hand, when the counter 8 does not count up the number of pulses corresponding to the data adjusted in step 7i (in step 7k), returning to the step 7g again, the control circuit 13 executes the same operation as described above.

Further, in step 7j, when the actual brush noise pulse intervals generated by the direct current brush motor 2 are out of the adjusted allowable range data of the pulse intervals, the control circuit 13 determines that the film is not loaded correctly, and generates an alarm generating signal for the sound generator 15.

In response to this signal, the sound generator 15 generates an alarm sound and executes the film loading error process (in step 7o) to brake and stop the direct current brush motor 2 (in step 7n).

Figure 8:
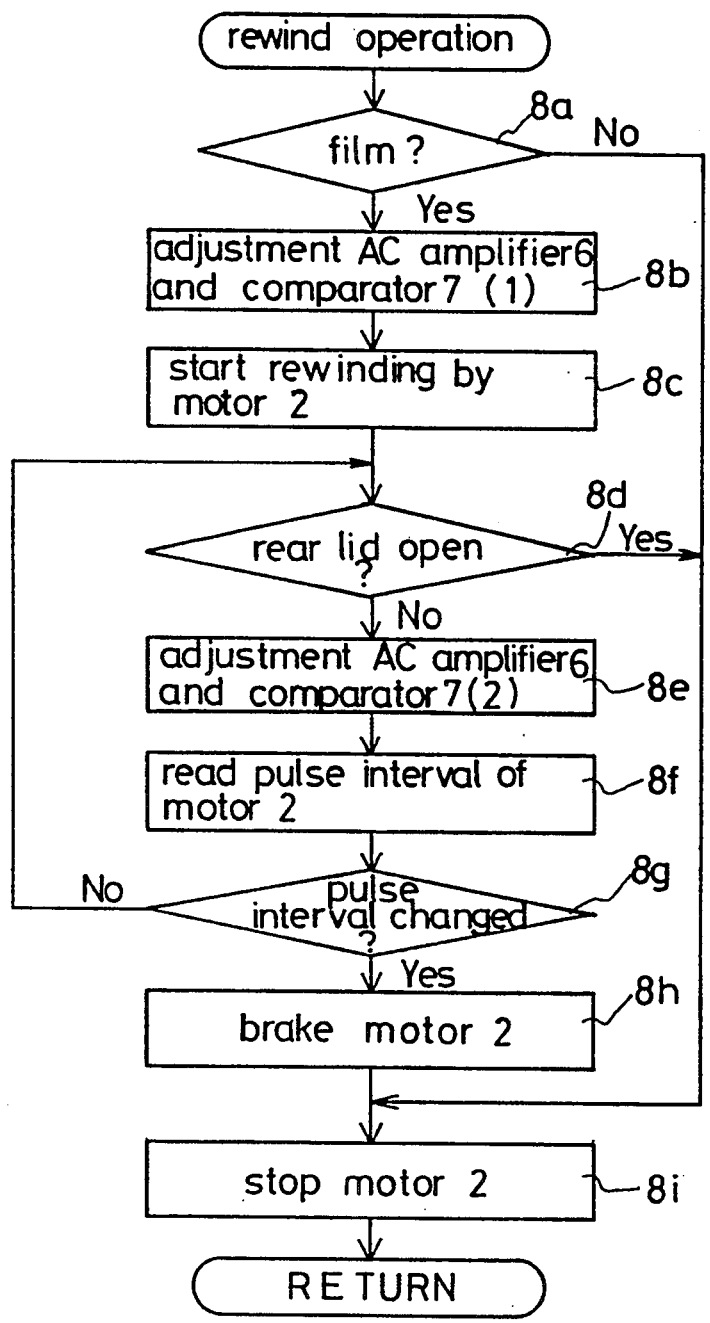
FIG. 8 is a flowchart for assistance in explaining the operation of the embodiment shown in FIG. 1.

The operation of the film rewinding operation will now be described in more detail hereinbelow with reference to FIG. 8.

When the rewinding switch is operated or when the film winding-up operation of the direct current brush motor 2 stops due to the end of the film having been reached, the film detecting device (not shown) detects the presence or absence of the film (in step 8a), and the adjustment process 1 of the AC amplifier 6 and the comparator 7 is executed (in step 8b).

This adjustment process 1 of the AC amplifier 6 and the comparator 7 is the same as that already described with reference to FIG. 4.

The control circuit 13 starts the film rewinding operation by driving the direct current brush motor 2 (in step 8c).

In the same way as described above, the brush noise generated by the direct current brush motor 2 is amplified by the AC amplifier 6 and input to the comparator 7. Whenever brush noise beyond the threshold value is detected, the comparator 7 generates one pulse to the counter 8 and the control circuit 13.

The rear lid status is monitored by executing the process described later. When the lid is opened during the film rewinding operation (in step 8d), the control circuit 13 interrupts the film rewinding operation and stops the direct current brush motor 2 from being rotated (in step 8i).

When the rear lid is closed, the control circuit 13 executes the adjustment process 2 of the AC amplifier 6 and the comparator 7 in order to detect the brush noise of the direct current brush motor 2 accurately (in step 8e).

The adjustment process 2 of the AC amplifier 6 and the comparator 7 is the same as that described above with reference to FIG. 5.

When the intervals of the brush noise pulses input from the comparator 7 to the control circuit 13 change abruptly (in steps 8f and 8g), the control circuit 13 determines that the film rewinding operation has ended and the direct current brush motor 2 is released from the load, and applies a brake to the direct current motor 2 (in step 8h) to stop the motor 2 (in step 8i).

In other words, since the load applied to the direct current brush motor 2 decreases abruptly at the end of the film rewinding operation, the pulse intervals of the brush noise is decreased, so that the control circuit 13 determines that the film rewinding operation has ended.

Further, in the above-mentioned embodiment, the pulse interval of the brush noise is used as a criterion in the determination of whether or not the direct current brush motor 2 is rotating normally and the film is wound up or rewound normally. Without being limited thereto, however, it is also possible to use the period or the pulse width of the brush noise pulse, instead of the pulse interval of the brush noise.

Further, the present invention can be employed to a camera in which after a new film has been loaded, all the film frames are once wound up and then rewound frame by frame whenever a photograph is taken.

Further, in the above-mentioned embodiment, the resistor 5 is used to detect brush noise of the direct current brush motor 2. Without being limited thereto, however, it is possible to detect the brush noise by integrating the diodes 3 and the transistors 4 for driving the direct current brush motor 2 in a single IC chip and by detecting a voltage drop across the IC pattern resistance or bonding resistance.

An embodiment of the invention for photographing data such as a date on the film will be described hereinbelow.

Figure 9:
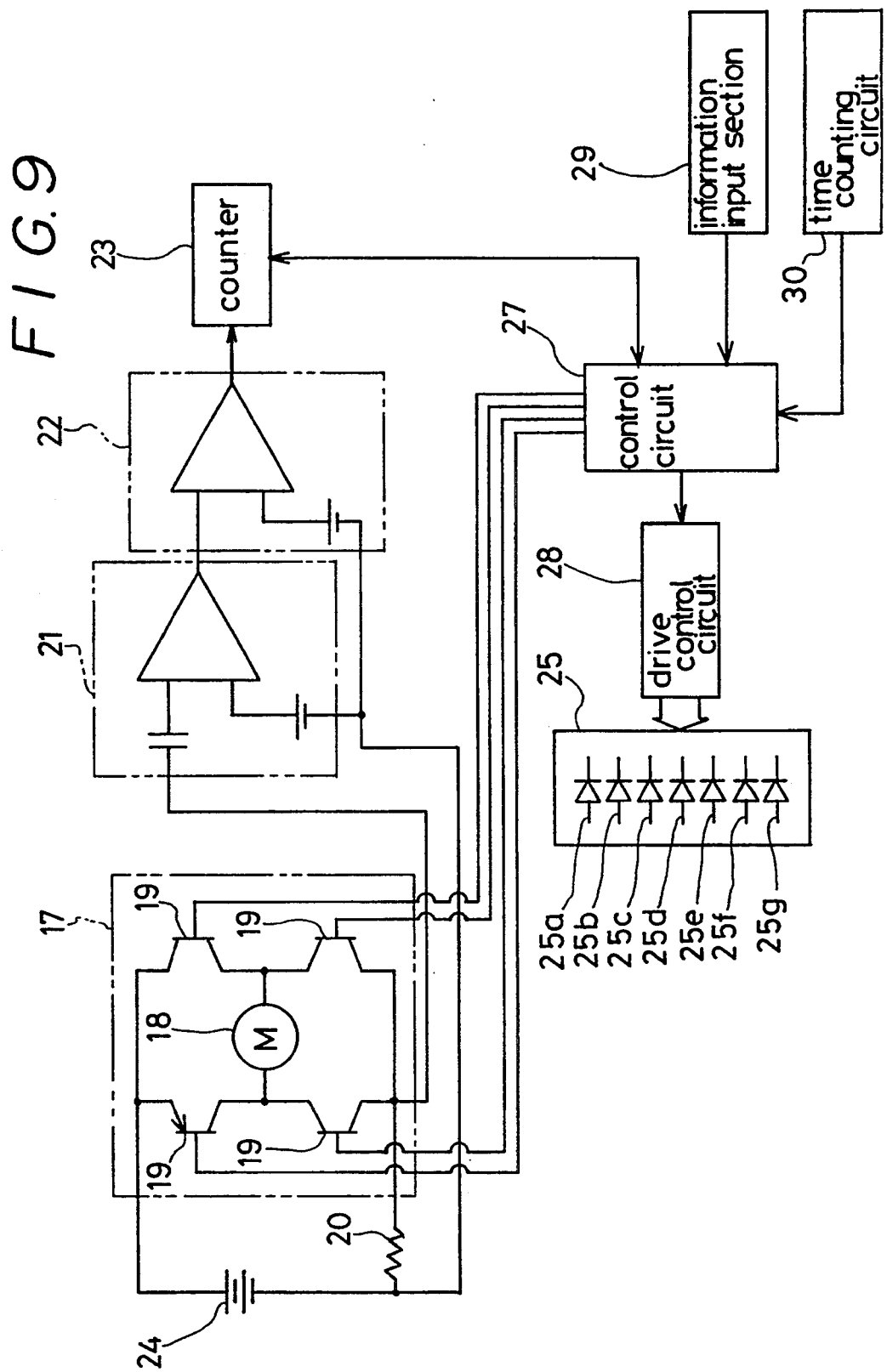
FIG. 9 is a circuit block diagram showing another embodiment of the present invention.
Figure 10:
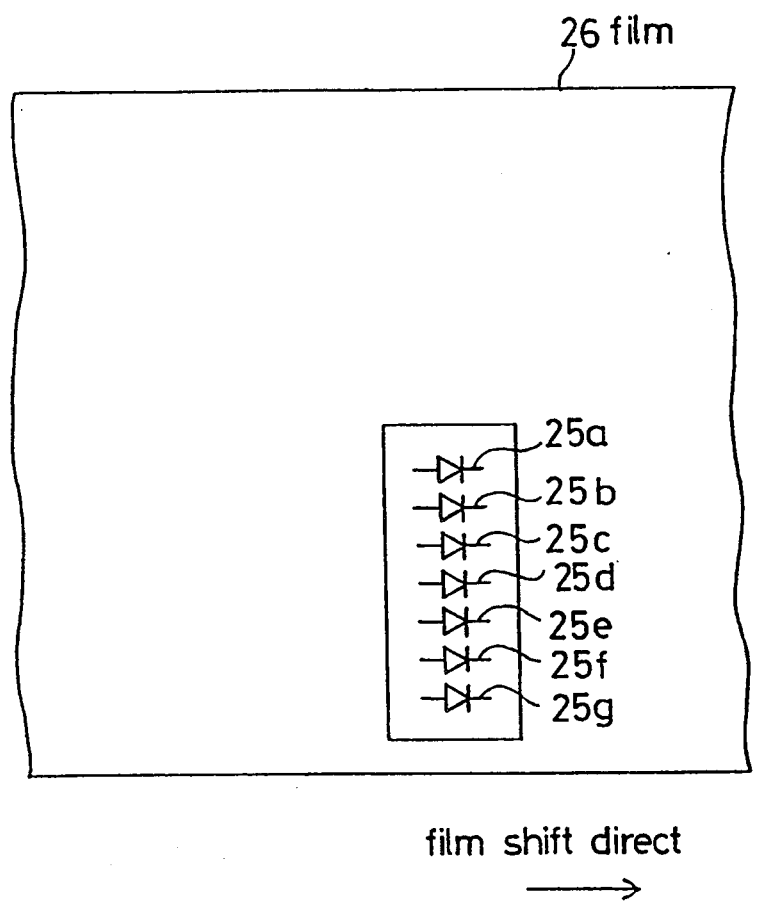
FIG. 10 is an illustration showing an essential portion of the embodiment shown in FIG. 9.

With reference to FIG. 9, the apparatus comprises a motor bridge circuit 17, a direct current brush motor 18 for feeding a film, transistors 19 for controlling the bi-directional rotation of the direct current brush motor 18, a resistor 20 for detecting brush noise generated when the direct current brush motor 18 is rotating, an AC amplifier 21, a comparator 22 for waveform-shaping the brush noise generated by the direct current brush motor 18, a counter 23 comprised of variable dividers for counting the number of brush noises, a battery power supply 24, an LED array 25 comprised of seven LEDs (light emitting diodes) 25a to 25g arranged in a straight line perpendicular to the direction in which a film 26 is fed as shown in FIG. 10, a control circuit 27 comprised of a CPU, ROM, RAM, etc. for detecting a predetermined amount of film shift movement on the basis of the value counted by the counter 23 to control the operation of the LED array 25 and other various operations, a drive control circuit 28 for selectively activating the LEDs 25a to 25g in response to the signals from the control circuit 27, an information input section 29 such as a keyboard, switches, etc. to input data such as the number of film frames to the control circuit 27, a time counting circuit 30 for counting the current time and date.

The operation of the above-mentioned embodiment will now be described hereinbelow with reference to FIG. 11.

After a photograph has been taken, the control circuit 27 activates any required transistors 19 in the motor bridge circuit 17 in accordance with a sequence program stored in the ROM of the control circuit 27, in order to rotate the direct current brush motor 18 and thereby to start the film winding operation.

Figure 11A:
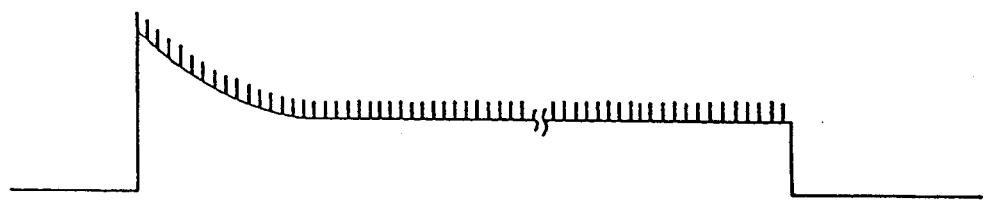
FIGS. 11(a) through 11(e) show a timing chart for assistance in explaining the operation of the embodiment shown in FIG. 9.
Figure 11B:
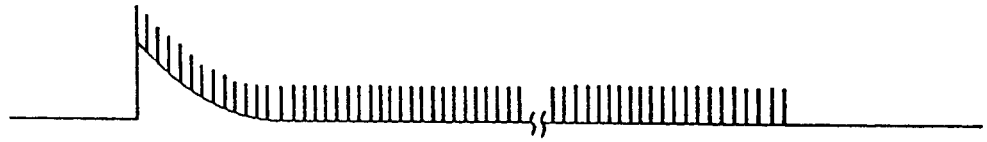

At this time, motor driving current as shown in FIG. 11(a) is passed through the resistor 20. Only the AC component of this motor driving current is amplified by the AC amplifier 21.

Figure 11C:

The signal amplified by the AC amplifier 21 is waveform-shaped by the comparator 22 into the signal as shown in FIG. 11(c), and then input to the counter 23.

Figure 11D:

The counter 23 which has already been cleared starts counting the input pulses, divides the input pulses appropriately as shown in FIG. 11(d) (divided into ¼ in this embodiment), and then applies the divided pulses to the control circuit 27.

The driving timings of the LEDs 25a to 25g are determined on the basis of the division ratio of the counter 23 which is designated by the control circuit 27.

The control circuit 27 counts the number of pulses generated by the counter 23. When the counted number reaches a predetermined value, the control circuit 27 determines that a data photographing position in the film reaches the position at which the LEDs 25a to 25g are arranged, and generates an LED array driving signal to the drive control circuit 28 in synchronism with the divided pulses of the counter 23.

This drive signal is generated on the basis of the date data applied from the time counting circuit 30.

In response to the input signal from the control circuit 27, the drive control circuit 28 selectively drives the LEDs 25a to 25g to photograph the date data on the film.

Figure 11E:
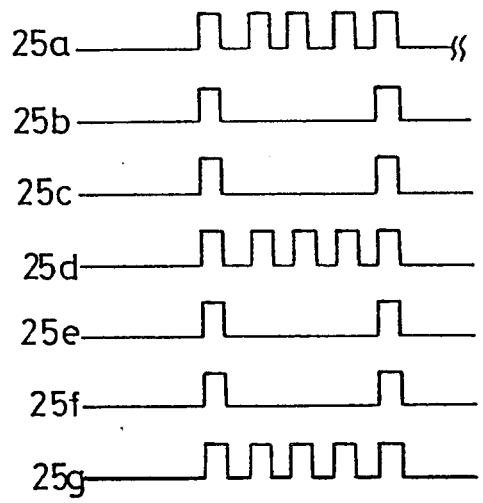

For instance, when "8" is photographed on the film, the LEDs 25a to 25g are selectively activated in synchronism with the output of the counter 23, as shown in FIG. 11(e).

As described above, the date is photographed automatically on the basis of the date data.

Further, in the case of a panoramic photograph, the division ratio of the counter 23 is reduced to decrease the size of the photographed characters.

Figure 12:
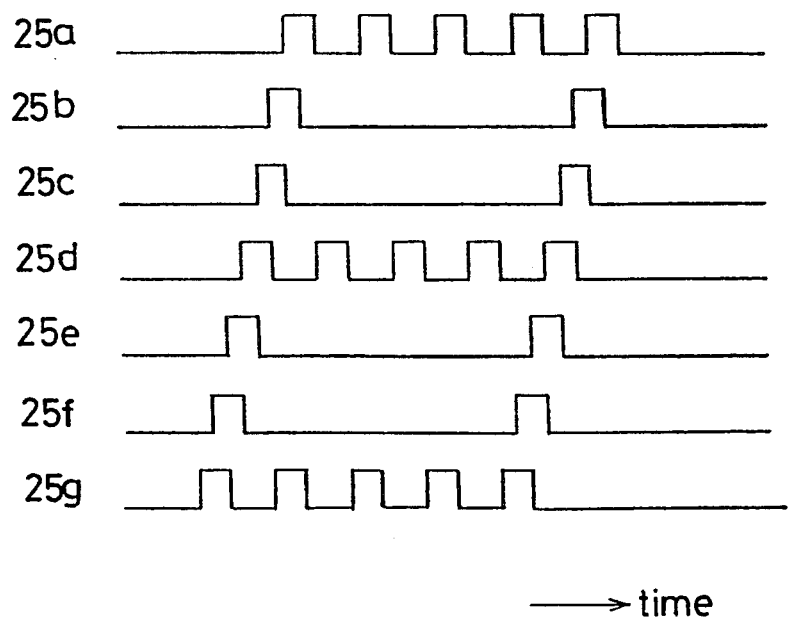
FIG. 12 is a timing chart for assistance in explaining the operation of the embodiment shown in FIG. 9.

In the above-mentioned embodiment, since all the LEDs 25a to 25g are turned on simultaneously, a large current corresponding to seven segments flows, so that a large load is applied to the battery. To overcome this problem, it is possible to make the current load uniform by shifting the timings at which the LEDs are turned on, as shown in FIG. 12, so that the style of the photographed date characters becomes oblique. Further, it is also possible to arrange the LED array 25 obliquely with respect to the line perpendicular to the film feeding direction A and to shift the timings at which the LEDs 25a to 25g are turned on in sequence in the above-mentioned arrangement order, as shown in FIG. 13.

In this case, it is possible to eliminate the inclination of the characters to be photographed by adjusting the inclination angle of the LEDs and the LED turning-on timings appropriately.

Further, it is also possible to arrange the LEDs in zigzag fashion, without arranging in a straight line, taking into consideration the size of the LEDs.

The timings at which the LEDs are turned off are determined in response to the output of the counter 23. Alternatively, it is also possible to turn off the LEDs by previously storing turn-off timings in the ROM of the control circuit 27 and by counting the time signal applied from the time counting circuit 30 by the control circuit 27.

The data photographed on the film is not limited to only the date, and other data indicative of time, messages, etc. can be photographed.

According to the present invention, since the photointerrupter can be eliminated, it is possible to reduce the size of the apparatus.

When a photointerrupter is used, a problem exists in that erroneous operation occurs if dust adheres to the detecting portion thereof. In the present invention, since electrical detection is employed, it is possible to obtain a higher reliability.

Since the amount of film winding is controlled in response to the pulse train obtained by waveform-shaping the brush noise generated when the direct current brush motor is rotating, it is possible to directly control the amount of film winding on the basis of the amount of motor rotation.

The control means control is the film winding-up operation by the direct current brush motor, until the number of pulses corresponding to the data (indicative of the amount of rotation of the direct current motor required to wind up a required number of film frames, which changes according to the amount of film wound up and stored in the storage means) has been counted. Therefore, it is possible to accurately control the amount of film winding on the basis of the amount of rotation of the motor.

Since the amount of rotation of the motor which is stored in the storage means is determined with due consideration to the amount of movement of the motor due to inertia after the direct current brush motor has been braked, it is possible to wind up the film by a predetermined number of frames more accurately.

Since brush noise can be detected accurately even when the battery voltage varies, it is possible to wind up the film accurately.

Since brush noise can be detected accurately even if the ambient temperature varies, it is possible to wind up the film accurately.

Since brush noise can be detected accurately even if both the battery voltage and the ambient temperature vary, it is possible to wind up the film more reliably.

Since the amplification factor of the amplifier and/or the set threshold level of the comparing means can be controlled as a function of the rotational speed of the direct current motor, the brush noise can be detected accurately even if the rotational speed of the direct current motor varies. Therefore, it is possible to wind the film accurately.

Since the amplification factor of the amplifier and/or the set threshold level of the comparing means are adjusted as a function of the characteristics of the direct current brush motor to be used, even if the direct current brush motors have different characteristics, the brush noise can be detected accurately. Therefore, it is possible to wind up the film accurately.

It is possible to accurately determine whether the film has been loaded and additionally whether the film has been completely wound up or rewound.

Since the direct current brush motor stops rotating to inhibit the camera from taking a photograph when a loading error is detected, it is possible to prevent the camera from taking photographs in the event of a film loading error.

Since an alarm is produced in the event of a film loading error, it is possible to inform the user of the occurrence of the film loading error and to let the user reload the film.

Furthermore, since the criterion on which the loading error is based can be adjusted as a function of the battery voltage or the ambient temperature, it is possible to detect a film loading error accurately under any conditions.

In addition, it is possible to photograph any data accurately.

Although the present invention has been fully described by way of example with reference to the accompanying drawings, it is to be understood that various changes and modifications will be apparent to those skilled in the art. Therefore, unless such changes and modifications depart from the scope of the invention, they should be construed as being included therein.

What we claim is:

1. An apparatus for winding up film in a camera, comprising:
   a direct current brush motor for winding up said film;
   means for detecting brush noise made by said motor during rotation thereof and for producing a pulse train in response thereto; and
   means responsive to said pulse train for controlling winding up of said film.

2. An apparatus for winding up film in a camera, comprising
   a direct current brush motor for winding up said film;
   means for detecting brush noise made by said motor during rotation thereof and for producing a pulse train in response thereto;
   counter means for counting pulses of said pulse train;
   storage means for storing data indicative of an amount of rotation of said direct current brush motor required to wind up a predetermined number of frames of said film, and means for changing said data according to an amount of film that has been wound up; and
   control means connected to allow said motor to wind up film until said counter counts up a number of pulses corresponding to said data indicative of the amount of rotation, stored in said storage means.

3. The apparatus of claim 2 comprising means for determining said amount of rotation according to inertia of said direct current brush motor.

4. An apparatus for winding up film in a camera, comprising:
   a direct current brush motor for winding up said film;
   means for producing signals corresponding to brush noise made by said motor during rotation thereof, and means for amplifying said signals;
   comparing means connected to compare the output of said amplifying means with a predetermined level to generate an output when the amplifying means output exceeds said predetermined level;
   a battery power supply;
   battery voltage detecting means for detecting the voltage of said power supply, said battery voltage detecting means having an output; and
   control means for controlling an amplification factor of said amplifying means and/or said predetermined level of said comparing means according to the output of said battery voltage detecting means.

5. An apparatus for winding up film in a camera, comprising:
   a direct current brush motor for winding up said film;
   means for producing signals corresponding to brush noise made by said motor during rotation thereof, and means for amplifying said signals;
   comparing means connected to compare the output of said amplifying means with a predetermined level to generate an output when the amplifying means output exceeds said predetermined level;
   wind-up control means connected to control winding of said film in response to the output of said comparing means;
   temperature detecting means having an output; and
   control means for controlling an amplification factor of said amplifying means and/or said predetermined level of said comparing means according to the output of said temperature detecting means.

6. An apparatus for winding up film in a camera, comprising:
   a direct current brush motor for winding up said film;
   means for producing signals corresponding to brush noise made by said motor during rotation thereof, and means for amplifying said signals;
   comparing means connected to compare the output of said amplifying means with a predetermined level to generate an output when the amplifying means output exceeds said predetermined level;
   wind-up control means connected to control winding of said film in response to the output of said comparing means;
   a battery power supply;
   battery voltage detecting means for detecting the voltage of said battery power supply, said battery voltage detecting means having an output;
   temperature detecting means having an output; and
   control means for controlling an amplification factor of said amplifying means and/or said predetermined level of said comparing means according to the outputs of said battery voltage detecting means and said temperature detecting means.

7. An apparatus for winding up film in a camera, comprising:
   a direct current brush motor for winding up said film;
   means for producing signals corresponding to brush noise made by said motor during rotation thereof, and means for amplifying said signals;

comparing means connected to compare the output of said amplifying means with a predetermined level to generate an output when the amplifying means output exceeds said predetermined level;

wind-up control means connected to control winding of said film in response to the output of said comparing means;

means for detecting the rotational speed of said motor;

a battery power supply; and control means for controlling an amplification factor of said controlling means and/or said predetermined level of said comparing means according to the rotational speed of said direct current brush motor.

8. An apparatus for winding up film in a camera, comprising:

a direct current brush motor for winding up said film;

means for producing signals corresponding to brush noise made by said motor during rotation thereof, and means for amplifying said signals;

comparing means connected to compare the output of said amplifying means with a predetermined level to generate an output when the amplifying means output exceeds said predetermined level;

wind-up control means connected to control winding of said film in response to the output of said comparing means;

storage means for storing data indicative of an amplification factor of said amplifying means and/or said predetermined level of said comparing means according to characteristics of said motor; and control means for adjusting said amplification factor and/or said predetermined level according to said data stored in said storage means.

9. An apparatus for winding up film in a camera, comprising:

a direct current brush motor for winding up said film;

means for producing signals corresponding to brush noise made by said motor during rotation thereof, and means for amplifying said signals;

comparing means connected to compare the output of said amplifying means with a predetermined level to generate an output when the amplifying means output exceeds said predetermined level;

wind-up control means connected to control winding of said film in response to the output of said comparing means;

temperature detecting means;

a battery power supply;

battery voltage detecting means for detecting voltage of said battery power supply;

storage means for storing data indicative of an amplification factor of said amplifying means and/or said predetermined level of said comparing means and said battery voltage detecting means; and control means for adjusting said amplification factor and/or said predetermined level according to said data stored in said storage means.

10. An apparatus for winding up film in a camera, comprising:

a direct current brush motor for winding up said film;

means for producing a pulse train of signals corresponding to brush noise made by said motor during rotation thereof; and control means for determining a film loading error in response to said pulse train.

11. The apparatus of claim 10 wherein said control means comprises means for stopping said direct current brush motor from rotating in response to a determination by said control means that a film loading error has occurred.

12. The apparatus of claim 10 further comprising informing means for generating an alarm in response to a determination by said control means that a film loading error has occurred.

13. The apparatus of claim 10 further comprising temperature detecting means for detecting temperature;

adjusting means for adjusting a criterion for determining a film loading error by said control means, in response to the output of said temperature detecting means.

14. The apparatus of claim 10 wherein said apparatus has a battery power supply, and further comprising battery voltage detecting means for detecting a voltage of a battery power supply; and adjusting means for adjusting a criterion for determining a film loading error by said control means in response to the output of said detecting means.

15. An apparatus for winding up film in a camera, comprising:

a direct current brush motor for winding up said film;

means for producing a pulse train of signals corresponding to brush noise made by said motor during rotation thereof; and means responsive to said pulse train of pulses for determining an end of a film winding operation by said motor.

16. An apparatus for winding up film in a camera, comprising:

a direct current brush motor for winding up said film;

means for producing a pulse train of signals corresponding to brush noise made by said motor during rotation thereof; and means responsive to said pulse train of pulses for determining an end of a film rewinding operation by said direct current brush motor.

17. A camera including an apparatus for winding up film in the camera, wherein said apparatus comprises:

a direct current brush motor for winding up said film;

means for producing a pulse train of signals corresponding to brush noise made by said motor during rotation thereof;

control means responsive to said pulse train of signals for counting the number of pulses in said pulse train; and data photographing means for photographing predetermined data onto said film in response to the counting by said control means of a determined number of pulses.

18. An apparatus for winding up film in a camera, comprising:

a direct current brush motor for winding up said film;

means for producing signals corresponding to brush noise made by said motor during rotation thereof, and means having an amplification factor for amplifying said signals;

comparing means connected to compare the output of said amplifying means with a predetermined level to generate an output when the amplifying means output exceeds said predetermined level;

a battery power supply;

battery voltage detecting means for detecting the voltage of said power supply, said battery voltage detecting means having an output; and control means for controlling the relative magnitudes of the amplification of said amplifying means and said predetermined level as a function of the output of said battery voltage detecting means.

19. An apparatus for winding up film in a camera, comprising:
a direct current brush motor for winding up said film;
means for producing signals corresponding to brush noise made by said motor during rotation thereof, and means having an amplification factor for amplifying said signals;
comparing means connected to compare the output of said amplifying means with a predetermined level to generate an output when the amplifying means output exceeds said predetermined level;
wind-up control means connected to control winding of said film in response to the output of said comparing means;
temperature detecting means having an output; and
control means for controlling the relative magnitudes of the amplification of said amplifying means and said predetermined level as a function of the output of said temperature detecting means.

20. An apparatus for winding up film in a camera, comprising:
a direct current brush motor for winding up said film;
means for producing signals corresponding to brush noise made by said motor during rotation thereof, and means having an amplification factor for amplifying said signals;
comparing means connected to compare the output of said amplifying means with a predetermined level to generate an output when the amplifying means output exceeds said predetermined level;
wind-up control means connected to control winding of said film in response to the output of said comparing means;
a battery power supply;
battery voltage detecting means for detecting the voltage of said battery power supply, said battery voltage detecting means having an output;
temperature detecting means having an output; and
control means for controlling the relative magnitudes of the amplification of said amplifying means and said predetermined level as a function of the outputs of said battery voltage detecting means and said temperature detecting means.

21. An apparatus for winding up film in a camera, comprising:
a direct current brush motor for winding up said film;
means for producing signals corresponding to brush noise made by said motor during rotation thereof, and means having an amplification factor for amplifying said signals;
comparing means connected to compare the output of said amplifying means with a predetermined level to generate an output when the amplifying means output exceeds said predetermined level;
wind-up control means connected to control winding of said film in response to the output of said comparing means;
means for detecting the rotational speed of said motor;
a battery power supply; and
control means for controlling the relative magnitudes of the amplification of said amplifying means and said predetermined level as a function of the rotational speed of said direct current brush motor.

22. An apparatus for winding up film in a camera, comprising:
a direct current brush motor for winding up said film;
means for producing signals corresponding to brush noise made by said motor during rotation thereof, and means having an amplification factor for amplifying said signals;
comparing means connected to compare the output of said amplifying means with a predetermined level to generate an output when the amplifying means output exceeds said predetermined level;
wind-up control means connected to control winding of said film in response to the output of said comparing means;
storage means for storing data indicative of the relative magnitudes of said amplification of said amplifying means and said predetermined level as a function of characteristics of said motor; and
control means for adjusting said relative magnitudes as a function of said data stored in said storage means.

23. An apparatus for winding up film in a camera, comprising:
a direct current brush motor for winding up said film;
means for producing signals corresponding to brush noise made by said motor during rotation thereof, and means having an amplification factor for amplifying said signals;
comparing means connected to compare the output of said amplifying means with a predetermined level to generate an output when the amplifying means output exceeds said predetermined level;
wind-up control means connected to control winding of said film in response to the output of said comparing means;
temperature detecting means having an output;
a battery power supply;
battery voltage detecting means for detecting voltage of said battery power supply, said battery voltage detecting means having an output;
storage means for storing data indicative of the relative magnitudes of said amplification of said amplifying means and said predetermined level as a function of output of said temperature detecting means and said battery voltage detecting means; and
control means for adjusting the relative magnitudes of the amplification of said amplifying means as a function of said data stored in said storage means.

24. An apparatus for winding up film in a camera, comprising:
a direct current brush motor for winding up said film;
means for producing a pulse train of signals corresponding to brush noise made by said motor during rotation thereof;
control means for determining a film loading error in response to said pulse train;
temperature detecting means for detecting temperature and having an output; and
adjusting means for adjusting a criterion for determining a film loading error by said control means, in response to the output of said temperature detecting means.

25. An apparatus for winding up film in a camera, comprising:
a direct current brush motor for winding up said film;
means for producing a pulse train of signals corresponding to brush noise made by said motor during rotation thereof;

control means for determining a film loading error in response to said pulse train;

said apparatus having a battery power supply, and further comprising battery voltage detecting means for detecting a voltage of a battery power supply, said battery voltage detecting means having an output; and adjusting means for adjusting a criterion for determining a film loading error by said control means in response to the output of said detecting means.

* * * * *